United States Patent
Dogan et al.

(10) Patent No.: US 7,966,211 B2
(45) Date of Patent: *Jun. 21, 2011

(54) DETERMINING AN INVENTORY TARGET FOR A NODE OF A SUPPLY CHAIN

(75) Inventors: Koray Dogan, Boston, MA (US); Adeel Najmi, Plano, TX (US); Mehdi Sheikhzadeh, Irving, TX (US); Ramesh Raman, San Carlos, CA (US)

(73) Assignee: i2 Technologies US, Inc., Dallas, TX (US)

(*) Notice: Subject to any disclaimer, the term of this patent is extended or adjusted under 35 U.S.C. 154(b) by 1579 days.

This patent is subject to a terminal disclaimer.

(21) Appl. No.: 10/836,448

(22) Filed: Apr. 29, 2004

(65) Prior Publication Data

US 2004/0243460 A1 Dec. 2, 2004

Related U.S. Application Data

(60) Provisional application No. 60/470,068, filed on May 12, 2003.

(51) Int. Cl.
*G06F 9/44* (2006.01)
(52) U.S. Cl. .................................. 705/7.31; 705/10
(58) Field of Classification Search ............... 705/10, 705/7

See application file for complete search history.

(56) References Cited

U.S. PATENT DOCUMENTS

| | | | | |
|---|---|---|---|---|
| 5,946,662 | A * | 8/1999 | Ettl et al. | 705/8 |
| 5,953,707 | A | 9/1999 | Huang et al. | |
| 6,078,900 | A | 6/2000 | Ettl et al. | |
| 6,151,582 | A * | 11/2000 | Huang et al. | 705/8 |
| 6,643,556 | B1 | 11/2003 | Morenz et al. | 700/106 |
| 7,324,966 | B2 * | 1/2008 | Scheer | 705/28 |

FOREIGN PATENT DOCUMENTS

| | | |
|---|---|---|
| TW | 476889 | 2/2002 |
| TW | 495690 | 7/2002 |

OTHER PUBLICATIONS

Keaton, Mark: "Using the Gamma Distribution to Model Demand When Lead Time is Random", Journal of Business Logistics, vol. 16, No. 1, 1995.*

Smith, Stephen A., *"Optimal Inventories for An (S—1, S) System With no Backorders*"* Management Science, vol. 23, No. 5, Copyright © 1977, the Institute of Management Sciences, pp. 522-528. Jan. 1977.

(Continued)

*Primary Examiner* — Romain Jeanty
*Assistant Examiner* — Mark A Fleischer
(74) *Attorney, Agent, or Firm* — Booth Udall, PLC; Steven J. Laureanti

(57) ABSTRACT

Determining an inventory target for a node of a supply chain includes calculating a demand stock for satisfying a demand over supply lead time at the node of the supply chain, and calculating a demand variability stock for satisfying a demand variability of the demand over supply lead time at the node. A demand bias of the demand at the node is established. An inventory target for the node is determined based on the demand stock and the demand variability stock in accordance with the demand bias.

20 Claims, 3 Drawing Sheets

OTHER PUBLICATIONS

Wolff, Ronald W., "*Poisson Arrivals See Time Averages*", Operations Research, vol. 30, No. 2, © 1982 Operations Research Society of America, pp. 223-231. Mar.-Apr. 1982.

Federgruen, Awi, et al., "*An Efficient Algorithm for Computing Optimal (s, S) Policies*", Operations Research, vol. 32, No. 6, © 1984 Operations Research Society of America, pp. 1268-1285. Nov.-Dec. 1984.

Svoronos, Antony, et al., "*Evaluation of One-For-One Replenishment Policies for Multiechelon Inventory Systems\**" Management Science, vol. 37, No. 1, Copyright © 1991, The Institute of Management Sciences, pp. 68-83. Jan. 1991.

"*Improving Service and Market Share with Inventory Optimization; How to improve both your top and bottom lines through superior inventory management*", White Paper, i2 Technologies, Inc., © Copyright 2003 i2 Technologies, Inc., 32 pages. Sep. 2003.

Johansen, Soren Glud, "*Base-stock policies for the lost sales inventory system with Poisson demand and Erlangian lead times*", Department of Operations Research, University of Aarhus, Denmark, pp. 1-14. Nov. 19, 2003.

\* cited by examiner

SS = SD + SV

DETERMINING AN INVENTORY TARGET FOR A NODE OF A SUPPLY CHAIN

RELATED APPLICATION

This application claims benefit under 35 U.S.C. §119(e) of U.S. Provisional Application No. 60/470,068, entitled "Strategic Inventory Optimization," filed May 12, 2003.

TECHNICAL FIELD

This invention relates generally to the field of supply chain analysis and more specifically to determining an inventory target for a node of a supply chain.

BACKGROUND

A supply chain supplies a product to a customer, and may include nodes that store inventory such as parts needed to produce the product. A known technique for determining the proper amount of inventory at each node may involve predicting the amount of inventory needed at the nodes to satisfy customer demand. Known techniques for determining the proper amount of inventory, however, may not be able to accurately predict the amount of inventory needed at the nodes. It is generally desirable to accurately predict the amount of inventory needed at the nodes.

SUMMARY OF THE INVENTION

In accordance with the present invention, disadvantages and problems associated with previous supply chain analysis techniques may be reduced or eliminated.

According to one embodiment of the present invention, determining an inventory target for a node of a supply chain includes calculating a demand stock for satisfying a demand over supply lead time at the node of the supply chain, and calculating a demand variability stock for satisfying a demand variability of the demand over supply lead time at the node. A demand bias of the demand at the node is established. An inventory target for the node is determined based on the demand stock and the demand variability stock in accordance with the demand bias.

Certain embodiments of the invention may provide one or more technical advantages. For example, an inventory target may be determined from a demand stock and a demand variability stock. The demand stock covers mean demand over lead time, and the demand variability stock covers demand variability over lead time. Using the demand stock and the demand variability stock to determine an inventory target may provide for a more accuracy. Historical data may be used to determine the inventory target. The demand stock and the demand variability stock may be used to adjust parameters such as the supply lead time, the demand variability, or both to optimize the inventory target.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is made to the following description, taken in conjunction with the accompanying drawings, in which.

DESCRIPTION OF EXAMPLE EMBODIMENTS

Figure 1:
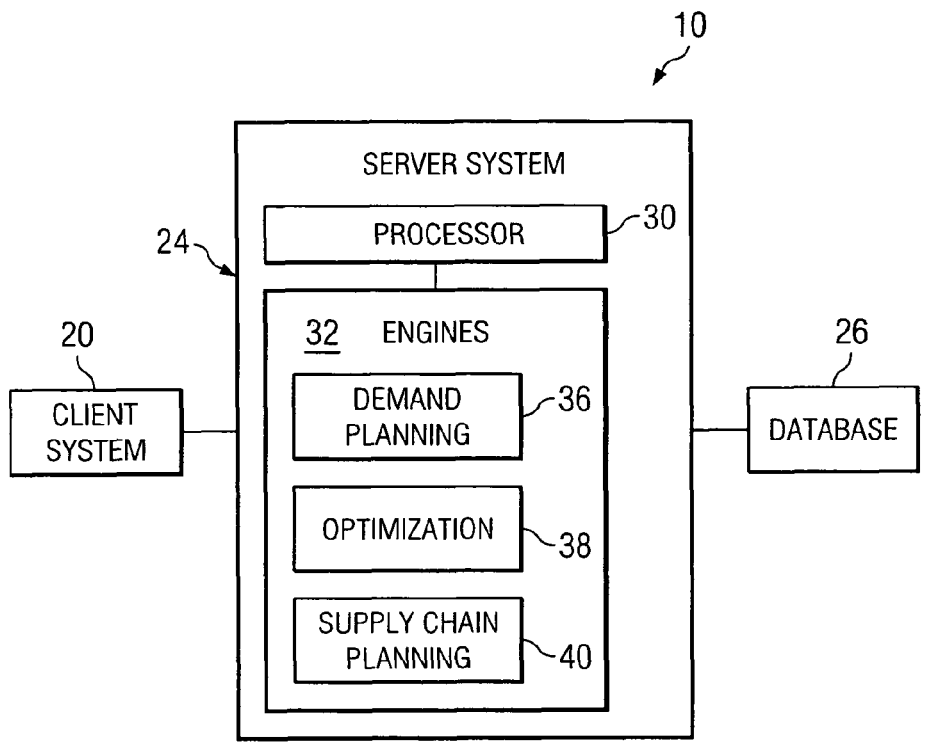
FIG. 1 is a block diagram illustrating an example system for determining an inventory target for a node of a supply chain.

FIG. 1 is a block diagram illustrating an example system 10 for determining an inventory target for a node of a supply chain that supplies products to customers in response to a demand. The demand may be represented as a predicted demand, which may be expressed as a mean demand and a demand variability. System 10 may, for example, calculate a demand stock and a demand variability stock for a node to satisfy the predicted demand. The demand stock covers mean demand over lead time, and the demand variability stock covers demand variability over lead time. System 10 may estimate an inventory target from the demand stock and the demand variability stock. According to one embodiment, system 10 may adjust the inventory target in response to historical data. According to another embodiment, system 10 may use the estimate of the inventory target to adjust parameters for the node such as the supply lead time, the demand variability, or both.

According to the illustrated embodiment, system 10 includes a client system 20, a server system 24, and a database 26 coupled as shown in FIG. 1. Client system 20 allows a user to communicate with server system 24 to optimize inventory in a supply chain. Server system 24 manages applications for optimizing inventory in a supply chain. Database 26 stores data that may be used by server system 24. According to the illustrated embodiment, server system 24 includes a processor 30 and one or more engines 32 coupled as shown in FIG. 1. Processor 30 manages the operation of server system 24, and may comprise any device operable to accept input, process the input according to predefined rules, and produce an output. According to the illustrated embodiment, engines 32 includes a demand planning engine 36, an optimization engine 38, and a supply chain planning engine 40.

Demand planning engine 36 generates a demand forecast that predicts the demand at the nodes of a supply chain. Optimization engine 38 optimizes the inventory at the nodes of a supply chain, and may estimate an inventory target from a demand stock and a demand variability stock. Supply chain planning engine 40 generates a plan for a supply chain. According to one embodiment, demand planning engine 36, optimization engine 38, and supply chain planning engine 40 may interact with each other. As an example, demand planning engine 36 may provide a demand forecast to optimization engine 38. Optimization engine 38 may optimize the inventory in accordance with the demand forecast in order to generate inventory targets, which are provided to supply chain planning engine 40. Supply chain planning engine 40 may generate a supply plan for the supply chain in accordance with the inventory targets.

According to one embodiment, optimization engine 38 may provide demand planning engine 36 and supply chain engine 40 with policy information. As an example, optimization engine may instruct demand planning engine 36 to decrease the demand variability of the demand estimate. As another example, optimization engine 38 may instruct supply chain planning engine 40 to decrease the supply lead time or supply lead time variation.

Client system 20 and server system 24 may each operate on one or more computers at one or more locations and may include appropriate input devices, output devices, mass storage media, processors, memory, or other components for receiving, processing, storing, and communicating information according to the operation of system 10. For example, the present invention contemplates the functions of both client system 20 and server system 24 being provided using a single computer system, such as a single personal computer. As used in this document, the term "computer" refers to any suitable device operable to accept input, process the input according to predefined rules, and produce output, for example, a server, workstation, personal computer, network computer, wireless telephone, personal digital assistant, one or more microprocessors within these or other devices, or any other suitable processing device. Database 26 may include any suitable data storage arrangement and may operate on one or more computers at one or more locations.

Client system 20, server system 24, and database 26 may be integrated or separated according to particular needs. Client system 20, server system 24, and database 26 may be coupled to each other using one or more computer buses, local area networks (LANs), metropolitan area networks (MANs), wide area networks (WANs), a global computer network such as the Internet, or any other appropriate wireline, optical, wireless, or other links.

Modifications, additions, or omissions may be made to system 10 without departing from the scope of the invention. For example, system 10 may have more, fewer, or other modules. Moreover, the operations of system 10 may be performed by more, fewer, or other modules. For example, the operations of simulation engine 34 and optimization engine 38 may be performed by one module, or the operations of optimization engine 38 may be performed by more than one module. Additionally, functions may be performed using any suitable logic comprising software, hardware, other logic, or any suitable combination of the preceding. As used in this document, "each" refers to at least one member of a set.

Figure 2:
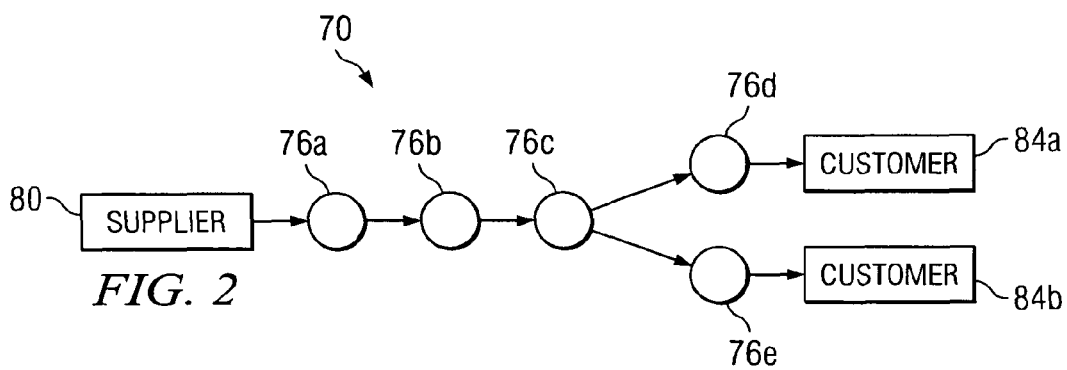
FIG. 2 is a diagram illustrating an example supply chain that receives supplies from one or more suppliers and provides products to one or more customers.

FIG. 2 is a diagram illustrating an example supply chain 70 that receives supplies from one or more suppliers 80 and provides products to one or more customers 84. Items flow through supply chain 70, and may be transformed or remain the same as they flow through supply chain 70. Items may comprise, for example, parts or supplies that may be used to generate the products. For example, an item may comprise a part of the product, or an item may comprise a supply that is used to manufacture the product, but does not become a part of the product. Downstream refers to the direction from suppliers 80 to customers 84, and upstream refers to the direction from customers 84 to suppliers 80.

Supply chain 70 may include any suitable number of nodes 76 and any suitable number of arcs 78 between nodes 76, configured in any suitable manner. According to the illustrated embodiment, items from supplier 80 flow to node 76a, which sends items to node 76b. Node 76b sends items to node 76c, which sends items to nodes 76d and 76e. Nodes 76d and 76e provide products to customers 84a and 84b, respectively. A supply lead time for a node 76 refers to the time it takes for a supply to be provided to the node 76 from an upstream node 76.

Although supply chain 70 is illustrated as having five nodes 76a-e and four arcs 78a-d, modifications, additions, or omissions may be made to supply chain 70 without departing from the scope of the invention. For example, supply chain 70 may have more or fewer nodes 76 or arcs 78. Moreover, nodes 76 or arcs 78 may have any suitable configuration. For example, node 76a may supply items to node 76c, but not to node 76b.

Certain characteristics of supply chain 70 may make it difficult for supply chain 70 to respond to a customer demand. For example, high demand variability and long supply lead times may hinder the responsiveness of supply chain 70. Redistributing inventory towards downstream nodes 76 of supply chain 70 may improve responsiveness. Distributing inventory towards downstream nodes 76, however, may increase the inventory cost and the risk of obsolete inventory. Accordingly, different nodes 76 of supply chain 70 may be selected as response buffers in order to balance the responsiveness and flexibility of supply chain 70.

Figure 3:
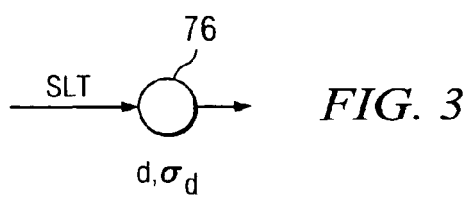
FIG. 3 is a diagram illustrating an example node of the supply chain of FIG. 2.

FIG. 3 is a diagram illustrating an example node 76 of supply chain 70 of FIG. 2. A demand forecast may be generated for node 76. The demand forecast may predict a mean demand over supply lead time and a demand variability. A demand stock and a demand variability stock may be estimated for the mean demand over supply lead time and the demand variability. The demand stock of a node 76 represents the stock calculated to cover the mean demand over the supply lead time at the node 76. The demand variability stock for a node 76 represents the stock calculated to cover the demand variability of the demand over the supply lead time at the node 76. Since the mean demand over supply lead time is deterministic and the demand variability is probabilistic, the demand stock is deterministic and the variability stock is probabilistic.

For example, the supply lead time SLT for node 76 may be SLT=2 weeks, and the demand forecast may predict a mean demand d=1,000 units per week with a demand variability $\sigma_d$=10%. Optimization engine 38 may calculate demand stock SD=d×SLT=(1,000 units/1 week)×2 weeks=2,000 units. The demand variability stock SV may be calculated according to SD×$\sigma_d$=2,000 units×10%=200 units. The inventory target IT may be estimated from SD and SV according to IT=SD+SV=2,000 units+200 units=2,200 units.

According to one embodiment, optimization engine 38 may calculate the demand stock independently from the demand variability stock. Separate calculations of the demand stock and the demand variability stock may aid in identifying changes to a supply chain 70 that may be made. For example, if the demand stock is 85% of the target inventory, and the demand variability stock is 15% of the total inventory, then a user may determine that decreasing the demand stock may be more beneficial than decreasing the demand variability stock.

Separate calculations of the demand stock and the demand variability stock may also provide visibility on how changing certain parameters such as the supply lead time, supply lead time variability, or demand variability affects optimization of inventory targets. For example, decreasing demand variability typically decreases the demand variability stock, which may allow for decreasing the inventory target, relaxing supply lead time requirements, or both. As another example, decreasing the supply lead time, supply lead time variability, or both typically decreases the demand stock, which may allow for decreasing the inventory target, relaxing demand variability requirements, or both.

Figure 4:
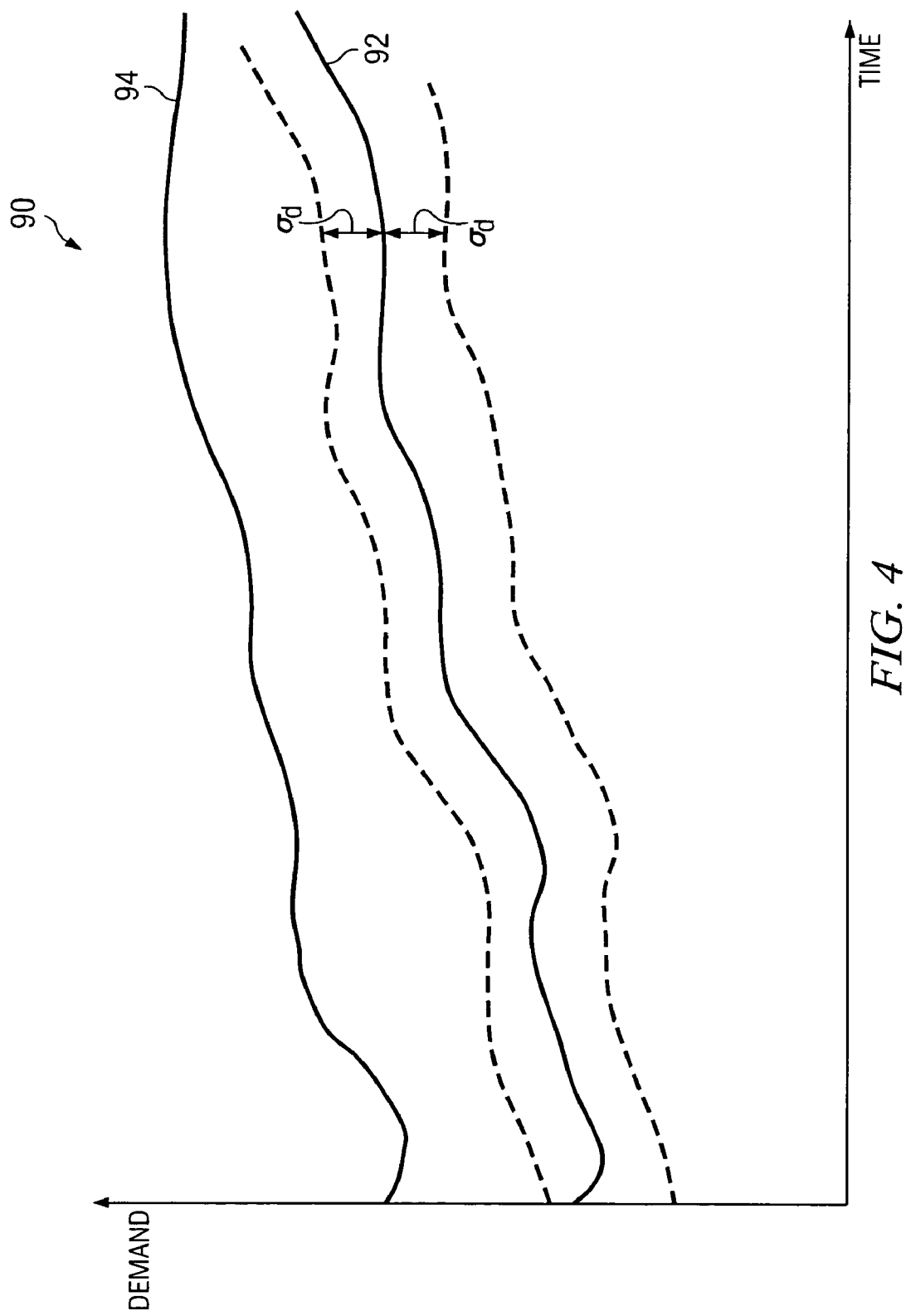
FIG. 4 is a graph illustrating a predicted demand and an actual demand with respect to time.

FIG. 4 is a graph 90 illustrating a predicted demand 92 and an actual demand 94 with respect to time. Predicted demand 92 represents a demand that is calculated without knowledge of the actual demand, and may be determined from a demand forecast generated by demand planning engine 36. Predicted demand 92 may include a mean demand d and a demand variability $\sigma_d$ with respect to time. Actual demand 94 represents the known demand. In the illustrated example, actual demand 94 is greater than predicted demand 92.

Different business models may use different types of demand forecasts or may not even use demand forecasts at all. Examples of business models include the build-to-forecast model, the assemble-to-order model, and the build-to-order model. According to the build-to-forecast model, products are produced in response to a demand forecast. Build-to-forecast models typically require an accurate and precise demand forecast. According to the assemble-to-order model, parts of the product may be produced, and then the product is assembled from the parts in response to an order. Assemble-to-order models typically require an accurate and precise demand forecast for the parts of the product. According to the build-to-order model, products are produced in response to an order from a customer rather than to a demand forecast.

Figure 5:
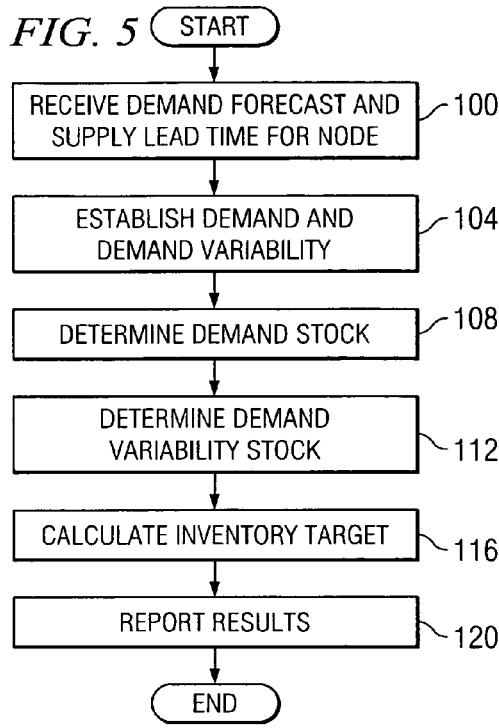
FIG. 5 is a flowchart illustrating an example method for determining an inventory target for a node of a supply chain.

FIG. 5 is a flowchart illustrating an example method for estimating an inventory target for a node 76 of supply chain 70. The method begins at step 100, where optimization engine 38 receives a demand forecast and a supply lead time for node 76. Demand planning engine 36 may provide the demand forecast, and supply chain planning engine 40 may provide the supply lead time. The demand forecast may include a mean demand and a demand variability. According to one example, the supply lead time SLT may be SLT=2 weeks. The mean demand and the demand variability are established from the demand forecast at step 104. According to one example, the demand forecast may predict a mean demand d=1,000 units per week with a demand variability $\sigma_d$=10%.

The demand stock is determined at step 108. The demand stock may represent the stock that covers the mean demand over a supply lead time. The demand stock SD may be calculated by multiplying the mean demand d per time unit by the supply lead time SLT. For example, SD=d×SLT=(1,000 units/1 week)×2 weeks=2,000 units. The demand variability stock is determined at step 112. The demand variability stock SV may be calculated by multiplying demand stock SD by variability $\sigma_d$ according to SV=SD×$\sigma_d$=2,000 units× 10%=200 units. The inventory target is calculated at step 116. The inventory target may be calculated by adding the demand stock with the demand variability stock. For example, inventory target IT may be estimated from SD and SV according to IT=SD+SV=2,000 units+200 units=2,200 units. The reports are resulted at step 120. After reporting the results, the method ends.

Modifications, additions, or omissions may be made to the method without departing from the scope of the invention. Additionally, steps may be performed in any suitable order without departing from the scope of the invention.

Figure 6:
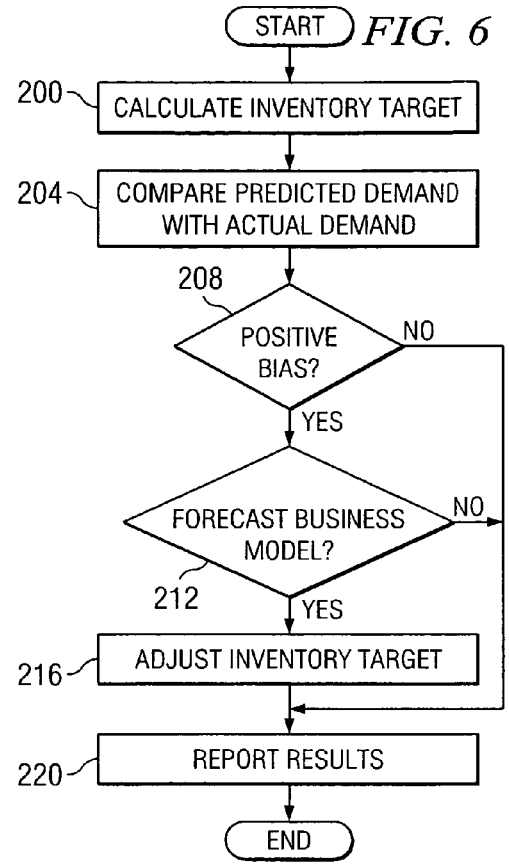
FIG. 6 is a flowchart illustrating an example method for determining an inventory target for a node of a supply chain in accordance with historical data.

FIG. 6 is a flowchart illustrating an example method for estimating inventory targets for supply chain 70 in accordance with historical data. The method begins at step 200, where optimization engine 38 calculates an inventory target for a node 76 of supply chain 70. The inventory target may be calculated according to the method described with reference to FIG. 5. For example, the inventory target IT may be determined from a demand stock SD and a demand variability stock SV according to IT=SD+SV. Predicted demand 92 is compared with the actual demand 94 at step 204. An example of predicted demand 92 and actual demand 94 is described with reference to FIG. 4.

Predicted demand 92 may exhibit a demand bias such as a positive bias when compared with actual demand 94. A demand bias refers to the tendency of predicted demand 92 to be greater than or less than actual demand 94. A positive bias occurs when predicted demand 92 is less than actual demand 94, and negative bias occurs when predicted demand 92 is greater than actual demand 94. If there is no positive bias, the method proceeds to step to 220.

If there is a positive bias, the method proceeds to step 212. Supply chain 70 may be associated with a forecast business model such as a build-to-forecast or an assemble-to-order business model. If the business model is not a forecast business model, the method proceeds to step 220. If the business model is a forecast business model, the method proceeds to step 216. At step 216, the inventory target is adjusted. The inventory target IT may be adjusted by, for example, ignoring the demand variability stock SV such that IT=SD. For a build-to-forecast business model, if the forecast for a product is positive, then the demand variability stock for the product might not be needed. For an assemble-to-order forecast, if the forecast for a part is positive, then the demand variability stock for the part might not be needed. The results are reported at step 220. After reporting the results, the method ends.

Modifications, additions, or omissions may be made to the method without departing from the scope of the invention. Additionally, steps may be performed in any suitable order without departing from the scope of the invention.

Figure 7:
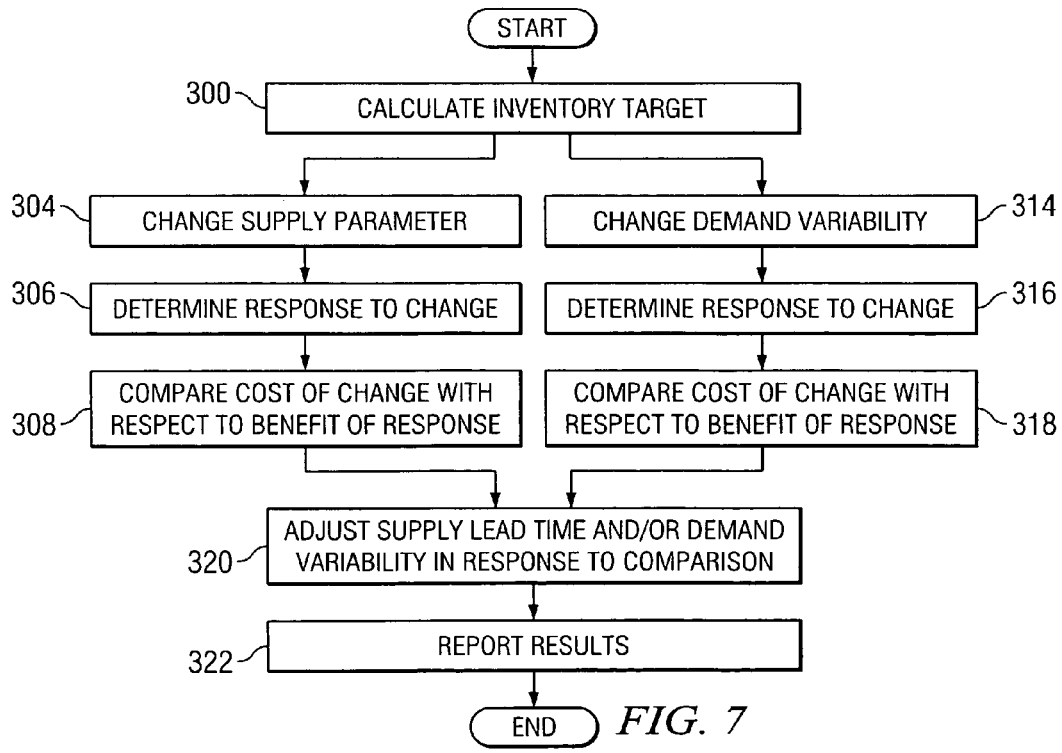
FIG. 7 is a flowchart illustrating an example method for optimizing an inventory target for a node of a supply chain.

FIG. 7 is a flowchart illustrating an example method for optimizing inventory in supply chain 70. The method may be used to determine the effect of changing a supply parameter, a demand parameter, or both on inventory optimization. A supply parameter refers to a parameter relevant to the supply for a node 76 such as the supply lead time or the supply lead time variability. A demand parameter refers to a parameter relevant to the demand on a node 76 such as the mean demand or the demand variability. The benefits of the response may be compared with the cost of the change in order to adjust an inventory target. The method begins at step 300, where optimization engine 38 calculates an inventory target. The inventory target may be calculated according to the method described with reference to FIG. 4. For example, the inventory target may be calculated by adding a demand stock to a demand variability stock.

Steps 304 through 308 describe changing a supply parameter such as a supply lead time or a supply lead time variability and evaluating the effects of the change. The supply parameter is changed at step 304. The supply parameter may be changed by, for example, decreasing the supply lead time. Changing a supply parameter however, typically has an associated cost. For example, costs related to decreasing a supply lead time may include an increase in delivery costs. The response to the change is determined at step 306. The response may have an associated benefit. For example, decreasing the supply lead time may result in a decrease in the demand stock, which in turn results in a decrease in the inventory target. The cost of the change is compared to the benefit of the response at step 308. After comparing, the method proceeds to step 320.

Step 314 through 318 describe changing the demand variability and evaluating the effects of the change. The demand variability is changed at step 314. For example, the demand variability may be decreased by improving the precision of the demand forecast received from demand planning engine 36. Changing the demand variability, however, may involve certain costs. For example, costs related to decreasing the demand variability may include the cost of purchasing software that generates a more precise demand estimate or the cost of increased time or data needed to produce a more precise demand estimate. The response to the change is determined at step 316. The response may have an associated benefit. For example, decreasing the demand variability may decrease the demand variability stock, which in turn may decrease the inventory target. The cost of the change is compared to the benefit of the response to the change at step 318. After comparing, the method proceeds to step 320.

The supply lead time, the demand variability, or both are adjusted in response to the comparisons at step 320. For example, if the benefit of changing the supply lead time outweighs the cost of changing the supply lead time, the supply lead time may be changed. As another example, if the benefit of changing the demand variability outweigh the cost of changing the demand variability, the demand variability may be changed. The results are reported at step 322. After reporting the results, the method ends.

Modifications, additions, or omissions may be made to the method without departing from the scope of the invention. For example, steps 304 through 308 or steps 314 through 318 may be omitted. Additionally, steps may be performed in any suitable order without departing from the scope of the invention. For example, steps 304 through 308 and steps 314 through 318 may be preformed concurrently such that changing the supply lead time and the demand variability at steps 304 and 314 may be preformed concurrently. The responses may be checked substantially simultaneously at step 306 and 316, and the costs and benefits may be compared substantially simultaneously at step 308 and 318.

Certain embodiments of the invention may provide one or more technical advantages. For example, an inventory target may be determined from a demand stock and a demand variability stock. The demand stock covers mean demand over lead time, and the demand variability stock covers demand variability over lead time. Using the demand stock and the demand variability stock to determine an inventory target may provide for a more accuracy. Historical data may be used to determine the inventory target. The demand stock and the demand variability stock may be used to adjust parameters such as the supply lead time, the demand variability, or both to optimize the inventory target.

Although an embodiment of the invention and its advantages are described in detail, a person skilled in the art could make various alterations, additions, and omissions without departing from the spirit and scope of the present invention as defined by the appended claims.

What is claimed is:

1. A computer-implemented method of determining an inventory target of a node of a supply chain, comprising:
    calculating by a computer, a demand stock that satisfies a demand over supply lead time at a node of a supply chain, the supply lead time represents a period of time to provide a supply to the node from another node of the supply chain;
    calculating by the computer, a demand variability stock that satisfies a demand variability of the demand over supply lead time at the node;
    establishing by the computer, a demand bias of the demand at the node; and
    determining by the computer, an inventory target of the node based on the demand stock and the demand variability stock in accordance with the demand bias by:
        changing a first supply parameter associated with the node;
        changing a first demand parameter associated with the node;
        changing a second demand parameter associated with the node, the change in the second demand parameter associated with a second demand cost;
        comparing the second demand cost and a second supply benefit;
        changing a third supply parameter associated with the node, the change in the third supply parameter associated with a third supply cost;
        comparing the third supply cost and a third demand benefit; and
        determining the inventory target of the node according to the change in the first supply parameter, the change in the first demand parameter, the comparison of the second demand cost and the second supply benefit, and the comparison of the third supply cost and the third demand benefit.

2. The method of claim 1, wherein determining the inventory target of the node based on the demand stock and the demand variability stock in accordance with the demand bias comprises:
    establishing that a predicted demand is less than an actual demand; and
    using the demand stock but not the demand variability stock in determining the inventory target.

3. The method of claim 1, wherein determining the inventory target of the node based on the demand stock and the demand variability stock in accordance with the demand bias comprises:
    detecting a difference in a second supply parameter according to the change in the second demand parameter, the difference in the second supply parameter associated with a second supply benefit.

4. The method of claim 1, wherein determining the inventory target of the node based on the demand stock and the demand variability stock in accordance with the demand bias comprises:
    detecting a difference in a third demand parameter according to the change in the third supply parameter, the difference in the third demand parameter associated with a third demand benefit.

5. The method of claim 1, further comprising:
    generating a demand forecast;
    determining the demand over supply lead time from the demand forecast; and
    determining the demand variability of the demand over supply lead time from the demand forecast.

6. The method of claim 1, further comprising:
    identifying a business model associated with the supply chain; and
    determining the inventory target of the node in accordance with the business model.

7. A system of determining an inventory target of a node of a supply chain, comprising:
    a database that stores information comprising a demand over supply lead time at a node of a supply chain and a demand variability of the demand over supply lead time at the node; and
    a computer system coupled with the database and configured to:
        calculate a demand stock that satisfies the demand over supply lead time at the node of the supply chain, the supply lead time represents a period of time to provide a supply to the node from another node of the supply chain;

calculate a demand variability stock that satisfies the demand variability of the demand over supply lead time at the node;

establish a demand bias of the demand at the node; and determine an inventory target of the node based on the demand stock and the demand variability stock in accordance with the demand bias by:

changing a first supply parameter associated with the node;

changing a first demand parameter associated with the node;

changing a second demand parameter associated with the node, the change in the second demand parameter associated with a second demand cost;

comparing the second demand cost and a second supply benefit;

changing a third supply parameter associated with the node, the change in the third supply parameter associated with a third supply cost;

comparing the third supply cost and a third demand benefit; and determining the inventory target of the node according to the change in the first supply parameter, the change in the first demand parameter, the comparison of the second demand cost and the second supply benefit, and the comparison of the third supply cost and the third demand benefit.

8. The system of claim 7, wherein the computer system is further configured to determine the inventory target of the node based on the demand stock and the demand variability stock in accordance with the demand bias by:

establishing that a predicted demand is less than an actual demand; and using the demand stock but not the demand variability stock in determining the inventory target.

9. The system of claim 7, wherein the computer system is further configured to determine the inventory target of the node based on the demand stock and the demand variability stock in accordance with the demand bias by:

detecting a difference in a second supply parameter according to the change in the second demand parameter, the difference in the second supply parameter associated with a second supply benefit.

10. The system of claim 7, wherein the computer system is further configured to determine the inventory target of the node based on the demand stock and the demand variability stock in accordance with the demand bias by:

detecting a difference in a third demand parameter according to the change in the third supply parameter, the difference in the third demand parameter associated with a third demand benefit.

11. The system of claim 7: wherein the computer system is further configured to:

generate a demand forecast;

determine the demand over supply lead time from the demand forecast; and determine the demand variability of the demand over supply lead time from the demand forecast.

12. The system of claim 7, wherein the computer system is further configured to:

identify a business model associated with the supply chain; and determine the inventory target of the node in accordance with the business model.

13. A non-transitory computer-readable medium embodied with software for determining an inventory target of a node of a supply chain, the software when executed by a computer configured to:

calculate a demand stock that satisfies a demand over supply lead time at a node of a supply chain, the supply lead time represents a period of time to provide a supply to the node from another node of the supply chain;

calculate a demand variability stock that satisfies a demand variability of the demand over supply lead time at the node;

establish a demand bias of the demand at the node; and determine an inventory target of the node based on the demand stock and the demand variability stock in accordance with the demand bias by:

changing a first supply parameter associated with the node;

changing a first demand parameter associated with the node;

changing a second demand parameter associated with the node, the change in the second demand parameter associated with a second demand cost;

comparing the second demand cost and a second supply benefit;

changing a third supply parameter associated with the node, the change in the third supply parameter associated with a third supply cost;

comparing the third supply cost and a third demand benefit; and determining the inventory target of the node according to the change in the first supply parameter, the change in the first demand parameter, the comparison of the second demand cost and the second supply benefit, and the comparison of the third supply cost and the third demand benefit.

14. The computer-readable medium software of claim 13, wherein the software is further configured to determine the inventory target of the node based on the demand stock and the demand variability stock in accordance with the demand bias by:

establishing that a predicted demand is less than an actual demand; and using the demand stock but not the demand variability stock in determining the inventory target.

15. The computer-readable medium of claim 13, wherein the software is further configured to determine the inventory target of the node based on the demand stock and the demand variability stock in accordance with the demand bias by:

detecting a difference in a second supply parameter according to the change in the second demand parameter, the difference in the second supply parameter associated with a second supply benefit.

16. The computer-readable medium of claim 13, wherein the software is further configured to determine the inventory target of the node based on the demand stock and the demand variability stock in accordance with the demand bias by:

detecting a difference in a third demand parameter according to the change in the third supply parameter, the difference in the third demand parameter associated with a third demand benefit.

17. The computer-readable medium of claim 13, wherein the software is further configured to:

generate a demand forecast;

determine the demand over supply lead time from the demand forecast; and determine the demand variability of the demand over supply lead time from the demand forecast.

18. The computer-readable medium of claim 13, wherein the software is further configured to:
   identify a business model associated with the supply chain; and
   determine the inventory target of the node in accordance with the business model.

19. A system of determining an inventory target of a node of a supply chain, comprising:
   means for calculating a demand stock that satisfies a demand over supply lead time at a node of a supply chain;
   means for calculating a demand variability stock that satisfies a demand variability of the demand over supply lead time at the node;
   means for establishing a demand bias of the demand at the node; and
   means for determining an inventory target of the node based on the demand stock and the demand variability stock in accordance with the demand bias by:
      changing a first supply parameter associated with the node;
      changing a first demand parameter associated with the node;
      changing a second demand parameter associated with the node, the change in the second demand parameter associated with a second demand cost;
      comparing the second demand cost and a second supply benefit;
      changing a third supply parameter associated with the node, the change in the third supply parameter associated with a third supply cost;
      comparing the third supply cost and a third demand benefit and
      determining the inventory target of the node according to the change in the first supply parameter, the change in the first demand parameter, the comparison of the second demand cost and the second supply benefit, and the comparison of the third supply cost and the third demand benefit.

20. A computer-implemented method of determining an inventory target of a node of a supply chain, comprising:
   generating by a computer, a demand forecast of a supply chain;
   determining by the computer, a demand over supply lead time at a node of the supply chain from the demand forecast;
   determining by the computer, a demand variability of the demand over supply lead time from the demand forecast;
   calculating by the computer, a demand stock that satisfies the demand over supply lead time at the node, the supply lead time represents a period of time to provide a supply to the node from another node of the supply chain;
   calculating by the computer, a demand variability stock that satisfies the demand variability of the demand over supply lead time at the node;
   establishing by the computer, a demand bias of the demand at the node;
   identifying by the computer, a business model associated with the supply chain; and
   determining by the computer, an inventory target of the node based on the demand stock and the demand variability stock in accordance with the demand bias and the business model by:
   changing by the computer, a first supply parameter associated with the node;
   changing by the computer, a first demand parameter associated with the node;
   changing by the computer, a second demand parameter associated with the node, the change in the second demand parameter associated with a second demand cost;
   detecting by the computer, a difference in a second supply parameter according to the change in the second demand parameter, the difference in the second supply parameter associated with a second supply benefit;
   comparing by the computer, the second demand cost and the second supply benefit;
   changing by the computer, a third supply parameter associated with the node, the change in the third supply parameter associated with a third supply cost;
   detecting by the computer, a difference in a third demand parameter according to the change in the third supply parameter, the difference in the third demand parameter associated with a third demand benefit;
   comparing by the computer, the third supply cost and the third demand benefit;
   establishing by the computer, that a predicted demand is less than an actual demand;
   using by the computer, the demand stock but not the demand variability stock in determining the inventory target; and
   determining by the computer, the inventory target of the node according to the change in the first supply parameter, the change in the first demand parameter, the comparison of the second demand cost and the second supply benefit, and the comparison of the third supply cost and the third demand benefit.

* * * * *

UNITED STATES PATENT AND TRADEMARK OFFICE
CERTIFICATE OF CORRECTION

| | | |
|---|---|---|
| PATENT NO. | : 7,966,211 B2 | Page 1 of 1 |
| APPLICATION NO. | : 10/836448 | |
| DATED | : June 21, 2011 | |
| INVENTOR(S) | : Koray Dogan et al. | |

It is certified that error appears in the above-identified patent and that said Letters Patent is hereby corrected as shown below:

IN THE CLAIMS:

Column 10, Lines 36-44, Claim 14, should read:

14. The computer-readable medium of claim 13, wherein the software is further configured to determine the inventory target of the node based on the demand stock and the demand variability stock in accordance with the demand bias by:
    establishing that a predicted demand is less than an actual demand; and
    using the demand stock but not the demand variability stock in determining the inventory target.

Signed and Sealed this
Thirtieth Day of August, 2011

David J. Kappos
*Director of the United States Patent and Trademark Office*